United States Patent
Shen et al.

(10) Patent No.: US 9,110,728 B2
(45) Date of Patent: Aug. 18, 2015

(54) ELASTIC ALLOCATION OF COMPUTING RESOURCES TO SOFTWARE APPLICATIONS

(75) Inventors: Jianjun Shen, Beijing (CN); Ying He, Palo Alto, CA (US); Hailing Xu, Peking (CN); Howie Xu, Sunnyvale, CA (US); Juntao Liu, Beijing (CN); Shudong Zhou, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 648 days.

(21) Appl. No.: 13/362,341

(22) Filed: Jan. 31, 2012

(65) Prior Publication Data

US 2013/0198319 A1 Aug. 1, 2013

(51) Int. Cl.
*G06F 15/16* (2006.01)
*G06F 9/455* (2006.01)
*G06F 9/50* (2006.01)

(52) U.S. Cl.
CPC .............. *G06F 9/5077* (2013.01); *G06F 9/455* (2013.01)

(58) Field of Classification Search
CPC combination set(s) only.
See application file for complete search history.

(56) References Cited

U.S. PATENT DOCUMENTS

| 8,065,676 | B1 * | 11/2011 | Sahai et al. | 718/1 |
| 2009/0276771 | A1 * | 11/2009 | Nickolov et al. | 717/177 |
| 2011/0138147 | A1 * | 6/2011 | Knowles et al. | 711/170 |

OTHER PUBLICATIONS vSphere Product Brochure, 2010, VMware, Inc.
vCenter AppSpeed Product Brochure, 2009, VMware, Inc.
Zeus Load Balancer Product Brochure, 2010, Zeus Technology Limited.

* cited by examiner

*Primary Examiner* — Abdullahi Salad

(57) ABSTRACT

Embodiments monitor application performance metrics representing the performance of a software application executed by one or more host computing devices. Based on the application of rules to the application performance metrics, an elasticity action, such as a power-on action, a power-off action, a deploy action, and/or a destroy action, is determined. The elasticity action is transmitted to one or more target hosts, which perform the elasticity action. The target host may be selected based on host performance metrics. Further, a load balancing service may accommodate the addition of a new software application instance to a cluster and/or the removal of an existing software application instance from the cluster.

14 Claims, 6 Drawing Sheets

ELASTIC ALLOCATION OF COMPUTING RESOURCES TO SOFTWARE APPLICATIONS

BACKGROUND

Software applications, such as virtual machines (VMs), may be executed by a group, or "cluster," of host computing devices. Each VM creates an abstraction of physical computing resources, such as a processor and memory, of the host executing the VM and executes a "guest" operating system, which, in turn, executes one or more software applications. The abstracted resources may be functionally indistinguishable from the underlying physical resources to the guest operating system and software applications.

The amount of computing resources allocated to each VM on a host can be designated manually by an administrator of the cluster and/or automatically according to resource policies set by the administrator. In some clusters, an operator attempts to distribute the use of computing resources, also known as the computing "load," across multiple hosts. For example, a fixed quantity of hosts may be configured to execute VMs that, in turn, execute a software application.

SUMMARY

One or more embodiments described herein provide elasticity in the allocation of virtual machines to a software application. In some embodiments, performance metrics representing the performance of the software application are monitored and evaluated according to one or more predetermined rules. Based on such rules, an elasticity action, such as a power-on action, a power-off action, a deploy action, and/or a destroy action, may be determined.

The elasticity action is transmitted to one or more target hosts, which perform the elasticity action, thereby controlling an operation of a software application instance and/or a virtual machine (VM). For example, a VM in a ready state may be powered on, such that a software application instance executed by the VM is available to respond to client requests. Target hosts may be selected based on host performance metrics, such as computing resource utilization.

In some embodiments, a load balancing service is employed to distribute computing resource utilization across a plurality of software application instances. As VMs are powered on, these VMs are added to the load balancing service. Similarly, as VMs are deactivated (e.g., powered off or suspended), these VMs are removed from the load balancing service.

This summary introduces a selection of concepts that are described in more detail below. This summary is not intended to identify essential features, nor to limit in any way the scope of the claimed subject matter.

DETAILED DESCRIPTION

Figure 1:
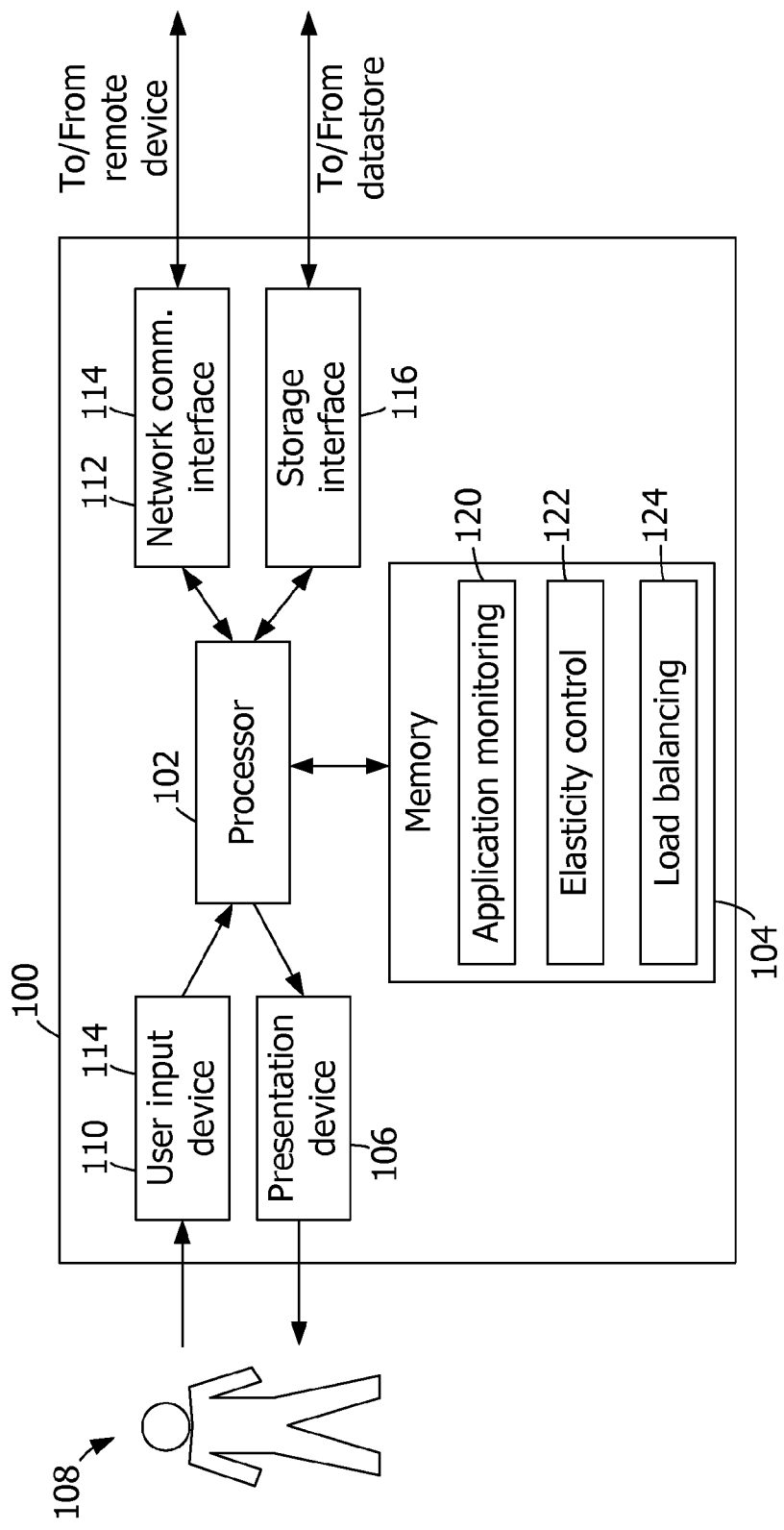
FIG. 1 is a block diagram of an exemplary computing device.

Embodiments described herein facilitate a combination of virtual application scaling, load balancing, and application health and performance monitoring. Such a combination enables automatic, intelligent scaling of virtual network applications per observed work loads. Such embodiments may be implemented as a framework that interfaces with various monitoring and/or load balancing services.

Exemplary embodiments employ dynamic allocation and deallocation of computing resources in a computing cluster according to one or more elasticity rules and one or more performance metrics that represent computing resource utilization or "load" in the computing cluster. For example, multiple instances of a software application may be executed in a computing cluster, and when a performance metric associated with the software application violates a predetermined threshold value, an elasticity action, such as a scale-up action or a scale-down action, may be performed. In some embodiments, when the application performance metric indicates that insufficient computing resources are allocated to the software application, a scale-up action is transmitted to one or more target hosts. In response, each target host activates or "powers on" an instance of the software application. Similarly, when the application performance metric indicates that excessive computing resources are allocated to the software application, a scale-down action is transmitted to one or more target hosts that are executing instances of the software application. In response, each target host deactivates or "powers off" an instance of the software application.

In such embodiments, the quantity of instances of the software application may be continually adjusted to ensure that the software application is allocated sufficient, but not excessive, computing resources. Accordingly, such embodiments may be understood to provide an elastic allocation of computing resources to software applications. Such elastic resource allocation facilitates automatically reducing power consumption when overall computing load is relatively low and increasing available computing resources when overall computing load is relatively high, such that the computing cluster remains responsive to client requests.

In one example, a web application is deployed to an infrastructure as a service (IaaS) cloud that provides web services using stateless web servers executed by a plurality of virtual machines (VMs). The web servers read and persist data to a shared database. The web services are oriented to customers in a specific region (e.g., a time zone or a geographic region) and may be assumed to receive a relatively large number of client requests during daytime while receiving relatively few client requests at night. Embodiments provided herein facilitate automatically and dynamically scaling the quantity of web application instances according to the observed or measured workload and distributing workloads to all web servers. Such dynamic scaling may conserve energy and resource consumption, and therefore cost, during non-busy times (e.g., when few client requests are received) while satisfying service requirements and/or user expectations during busy times (e.g., when many client requests are received).

Optionally, the embodiments described may enforce minimum and maximum quantities of working (e.g., powered on) and ready (e.g., powered off) instances. Further, interfaces to multiple application monitoring services may be included, such that performance metrics may be obtained using existing application performance monitoring systems. Similarly, interfaces to multiple load balancing services may be included, such that activation (e.g., power-on and/or resume) and deactivation (e.g., power-off and/or suspend) events may be communicated to and accommodated by existing load balancing systems.

FIG. 1 is a block diagram of an exemplary computing device 100. Computing device 100 includes a processor 102 for executing instructions. In some embodiments, executable instructions are stored in a memory 104. Memory 104 is any device allowing information, such as executable instructions, application performance metrics, host performance metrics, elasticity rules, elasticity actions, configuration options (e.g., threshold values), and/or other data, to be stored and retrieved. For example, memory 104 may include one or more random access memory (RAM) modules, flash memory modules, hard disks, solid state disks, and/or optical disks.

Computing device 100 also includes at least one presentation device 106 for presenting information to a user 108. Presentation device 106 is any component capable of conveying information to user 108. Presentation device 106 may include, without limitation, a display device (e.g., a liquid crystal display (LCD), organic light emitting diode (OLED) display, or "electronic ink" display) and/or an audio output device (e.g., a speaker or headphones). In some embodiments, presentation device 106 includes an output adapter, such as a video adapter and/or an audio adapter. An output adapter is operatively coupled to processor 102 and configured to be operatively coupled to an output device, such as a display device or an audio output device.

The computing device 100 may include a user input device 110 for receiving input from user 108. User input device 110 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of presentation device 106 and user input device 110.

Computing device 100 also includes a network communication interface 112, which enables computing device 100 to communicate with a remote device (e.g., another computing device 100) via a communication medium, such as a wired or wireless packet network. For example, computing device 100 may transmit and/or receive data via network communication interface 112. User input device 110 and/or network communication interface 112 may be referred to as an input interface 114 and may be configured to receive information, such as configuration options (e.g., elasticity rules and/or threshold values), from a user.

Computing device 100 further includes a storage interface 116 that enables computing device 100 to communicate with one or more datastores, which store virtual disk images, software applications, and/or any other data suitable for use with the methods described herein. In exemplary embodiments, storage interface 116 couples computing device 100 to a storage area network (SAN) (e.g., a Fibre Channel network) and/or to a network-attached storage (NAS) system (e.g., via a packet network). The storage interface 116 may be integrated with network communication interface 112.

In exemplary embodiments, memory 104 stores computer-executable instructions for performing one or more of the operations described herein. Memory 104 may include one or more computer-readable storage media that have computer-executable components embodied thereon. In the example of FIG. 1, memory 104 includes an application monitoring component 120, an elasticity control component 122, and a load balancing component 124.

When executed by processor 102, application monitoring component 120 causes processor 102 to determine an application performance metric based on a computing resource utilization associated with a software application, a response time associated with a software application, a client request rate associated with the software application, and/or a quantity of client sessions associated with the software application. When executed by processor 102, elasticity control component 122 causes processor 102 to determine an elasticity action, including a scale-up action and/or a scale-down action, based on the application performance metric, and to transmit the elasticity action to a target host computing device. The target host computing device applies the elasticity action to one or more instances of the software application. For example, the target host computing device may control an operation of an instance of a software application (e.g., power on or power off the instance) based on the elasticity action. When executed by processor 102, load balancing component 124 causes processor 102 to adjust an availability of the software application instance to receive client requests based on the elasticity action. Any portion of the illustrated components may be included in memory 104 based on the function of computing device 100.

Figure 2:
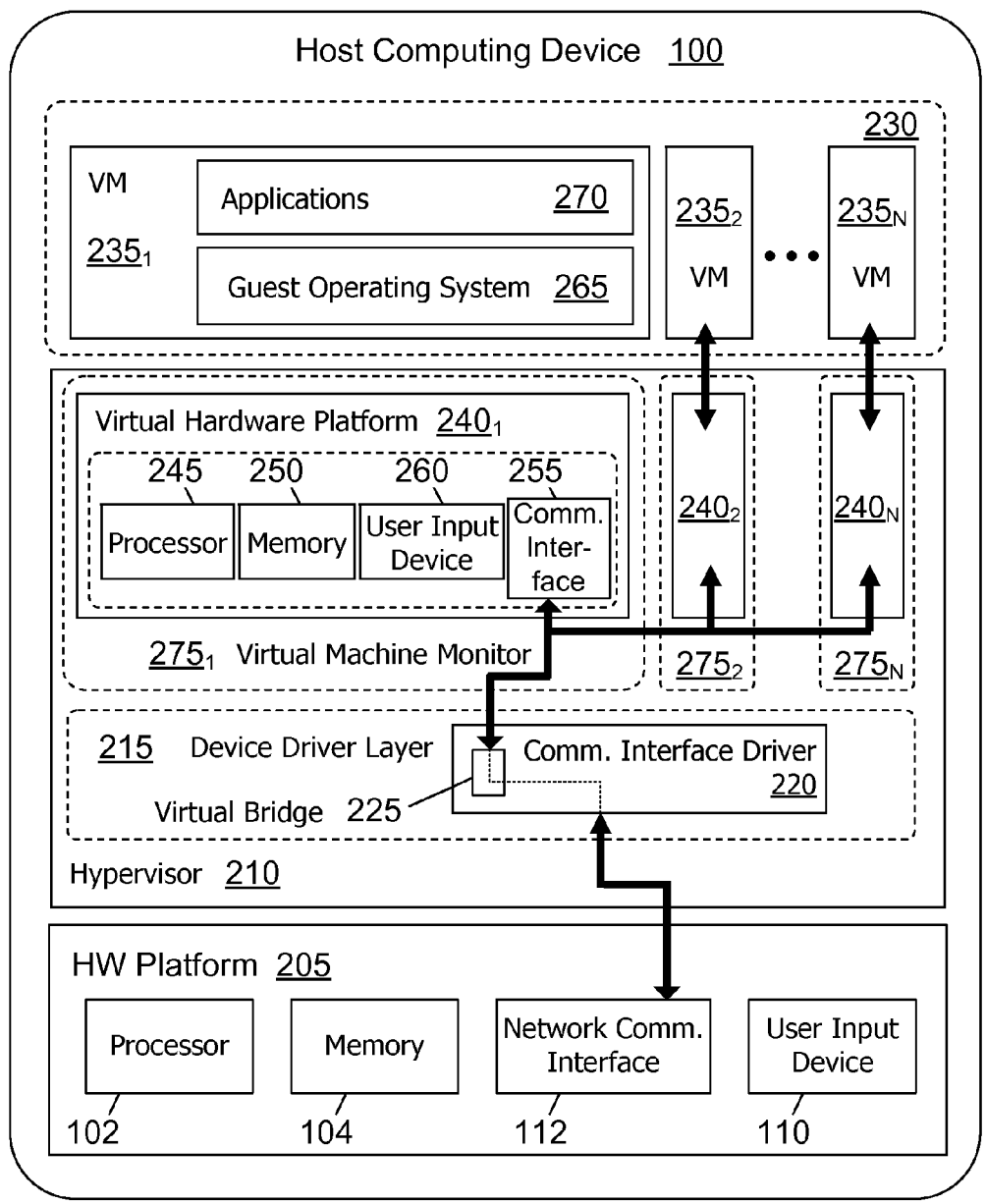
FIG. 2 is a block diagram of virtual machines that are instantiated on a computing device, such as the computing device shown in FIG. 1.

FIG. 2 depicts a block diagram of virtual machines $235_1$, $235_2 \ldots 235_N$ that are instantiated on a computing device 100, which may be referred to as a host computing device or simply a host. Computing device 100 includes a hardware platform 205, such as an x86 architecture platform. Hardware platform 205 may include processor 102, memory 104, network communication interface 112, user input device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user input device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user input device 260 and other emulated I/O devices in VM $235_1$).

In some embodiments, memory 250 in first virtual hardware platform $240_1$ includes a virtual disk that is associated with or "mapped to" one or more virtual disk images stored in memory 104 (e.g., a hard disk or solid state disk) of computing device 100. The virtual disk image represents a file system (e.g., a hierarchy of directories and files) used by first virtual machine $235_1$ in a single file or in a plurality of files, each of which includes a portion of the file system. In addition, or alternatively, virtual disk images may be stored in memory 104 of one or more remote computing devices 100, such as in a storage area network (SAN) configuration. In such embodiments, any quantity of virtual disk images may be stored by the remote computing devices 100.

Device driver layer 215 includes, for example, a communication interface driver 220 that interacts with network communication interface 112 to receive and transmit data from, for example, a local area network (LAN) connected to computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Virtual hardware platforms $240_1$-$240_N$ may be considered to be part of virtual machine monitors (VMM) $275_1$-$275_N$ which implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an embodiment of the disclosure is included as a component in VMware's ESX brand software, which is commercially available from VMware, Inc.

Figure 3:
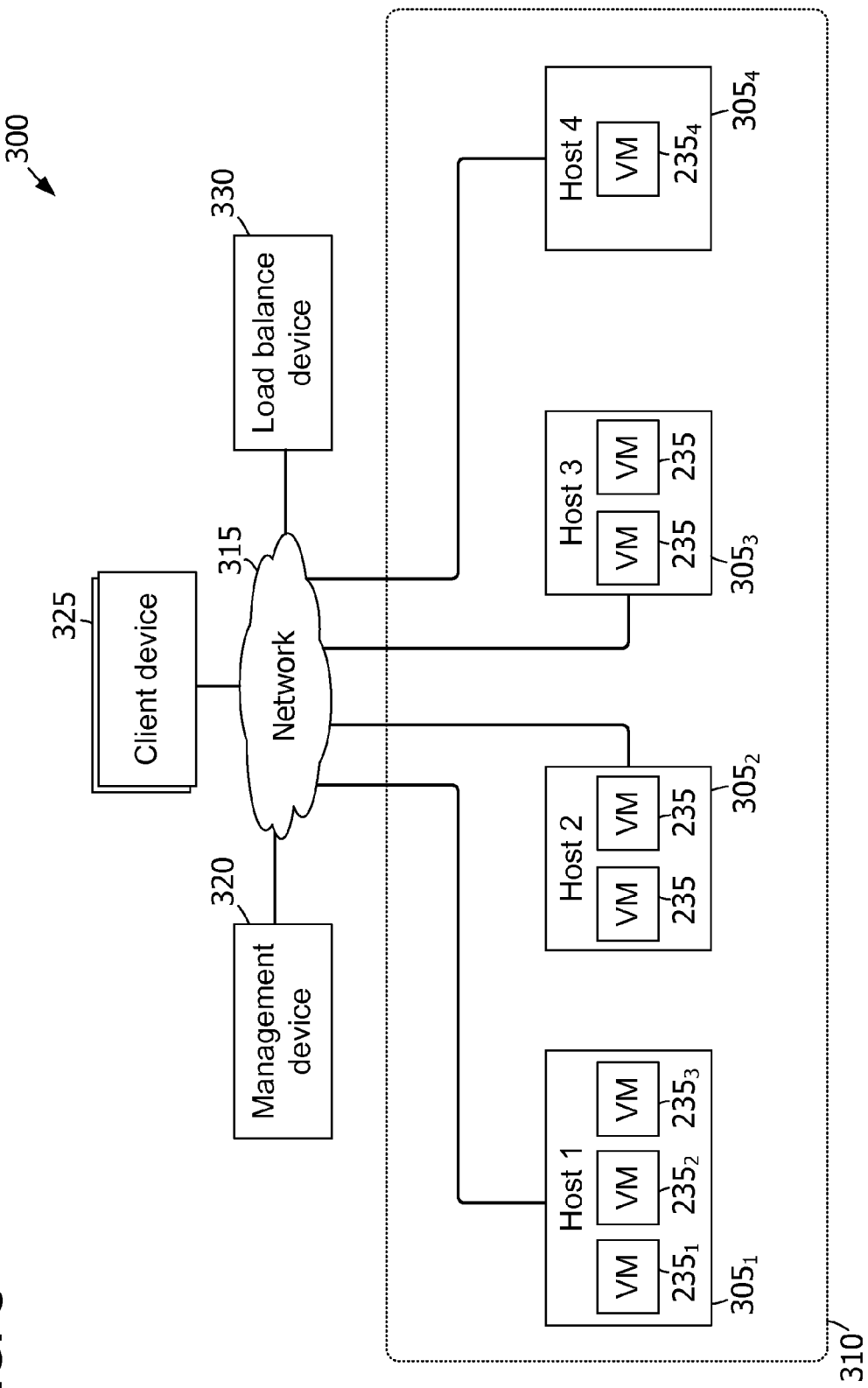
FIG. 3 is a block diagram of an exemplary cluster system including computing devices and virtual machines.

FIG. 3 is a block diagram of an exemplary cluster system 300 of hosts 305 and virtual machines (VMs) 235. Cluster system 300 includes a fault domain 310 with a first host $305_1$, a second host $305_2$, a third host $305_3$, and a fourth host $305_4$. Each host 305 executes one or more software application instances. For example, first host $305_1$ executes first VM $235_1$, second VM $235_2$, and third VM $235_3$, and fourth host $305_4$ executes fourth VM $235_4$. It is contemplated that fault domain 310 may include any quantity of hosts 305 executing any quantity of software application instances. Further, VMs 235 hosted by hosts 305 may execute other software application instances, such as instances of network services (e.g., web applications and/or web services), distributed computing software, and/or any other type of software that is executable by computing devices such as hosts 305.

Hosts 305 communicate with each other via a network 315. Cluster system 300 also includes a management device 320, which is coupled in communication with hosts 305 via network 315. In exemplary embodiments, management device 320 monitors and controls hosts 305. For example, management device 320 may monitor performance metrics (e.g., application performance metrics and/or host performance metrics) associated with hosts 305 and may further coordinate the execution of VMs and/or other software applications by hosts 305 based on the performance metrics. One or more client devices 325 are coupled in communication with network 315, such that client devices 325 may submit requests to hosts 305. For example, hosts 305 may execute instances of software applications that provide data in response to requests from client devices 325.

In some embodiments, cluster system 300 also includes a load balance device 330 that communicates with management device 320, software application instances (e.g., VMs 235 and/or software application instances executed by VMs 235), hosts 305, and/or client devices 325. Load balance device 330 is configured to receive requests from client devices 325 and to forward the received requests to the software application instances hosted by hosts 305. In exemplary embodiments, requests are forwarded to VMs 235 in a manner that distributes the computing resource utilization, or "load," associated with responding to the requests across VMs 235 and/or hosts 305. For example, load balance device 330 may forward requests to VMs 235 in rotation (e.g., a "round-robin" rotation), such as by forwarding a first request to first VM $235_1$, a second request to second VM $235_2$, and so on. As another example, load balance device 330 may forward requests to hosts 305 in rotation. In addition, or alternatively, load balance device 330 may forward requests to VMs 235 based on host performance metrics corresponding to VMs 235. For example, load balance device 330 may forward a request to the VM 235 associated with the lowest host load among VMs 235 at the time the request is received from a client device 325.

Although management device 320 is shown outside fault domain 310, the functions of management device 320 may be incorporated into fault domain 310. For example, management device 320 may be included in fault domain 310. Alternatively, the functions described with reference to management device 320 may be performed by one or more hosts 305 or VMs 235 executed by one or more hosts 305 in fault domain 310. That is, the functionality of management device 320 may be implemented by executable code running on one or more devices with processing capability. Hosts 305, management device 320, client device 325, and/or load balance device 330 may be computing devices 100 (shown in FIG. 1).

In exemplary embodiments, each host 305 in fault domain 310 provides host information to management device 320. The host information includes, for example, the software application instances being executed by a host 305, application performance metrics, computing resources allocated to software application instances being executed by the host 305, one or more host performance metrics associated with the host 305, and/or events, such as the initiation of an execution of a software application instance (e.g., an instance power-on event) or a termination of a software application instance (e.g., an instance power-off event) by the host 305. Management device 320 receives the host information from hosts 305 in fault domain 310 and applies elasticity rules to determine whether to perform one or more elasticity actions, as described in more detail below.

Figure 4:
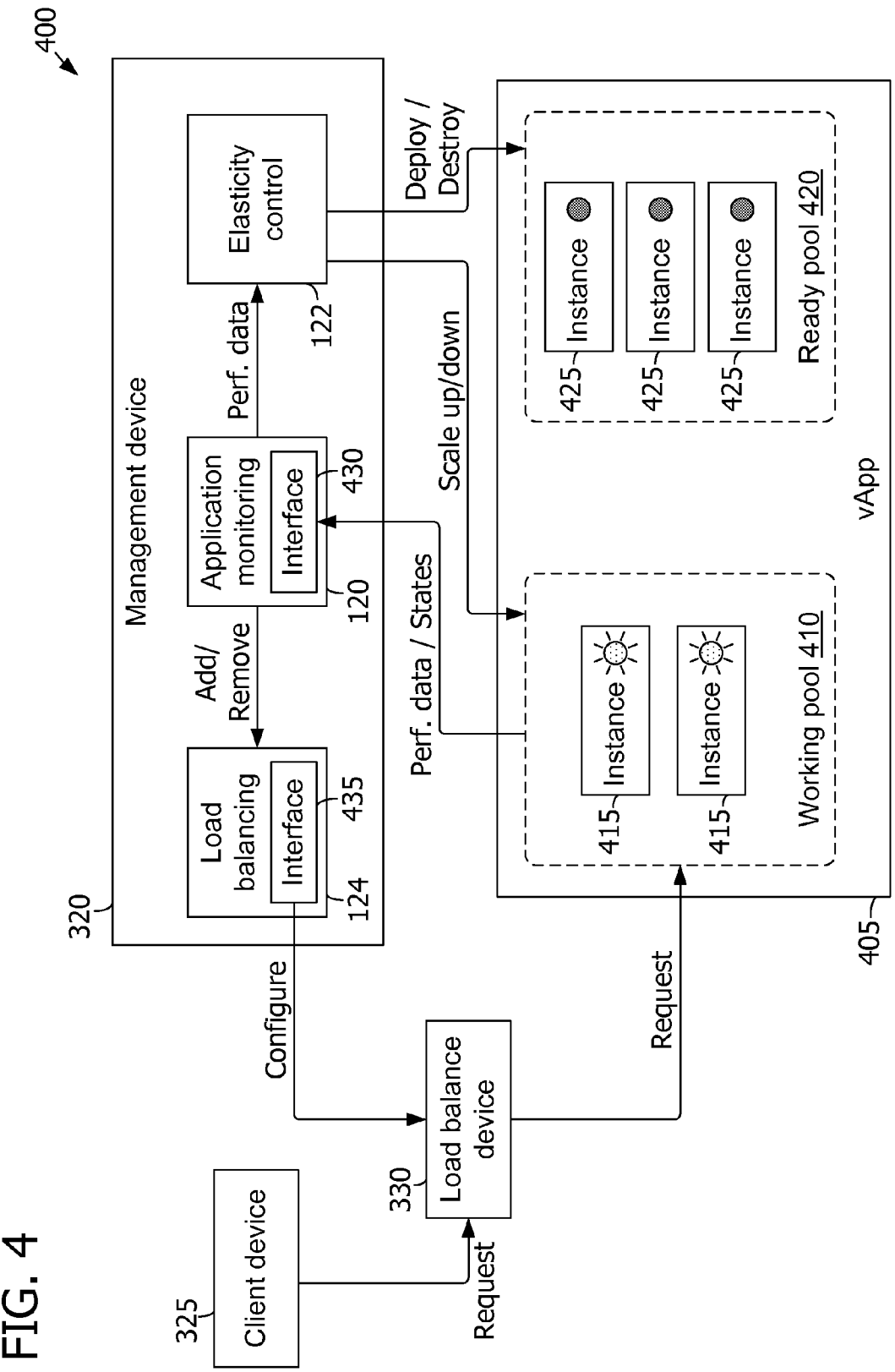
FIG. 4 is a block diagram of an exemplary data flow within the cluster system shown in FIG. 3.
Figure 5:
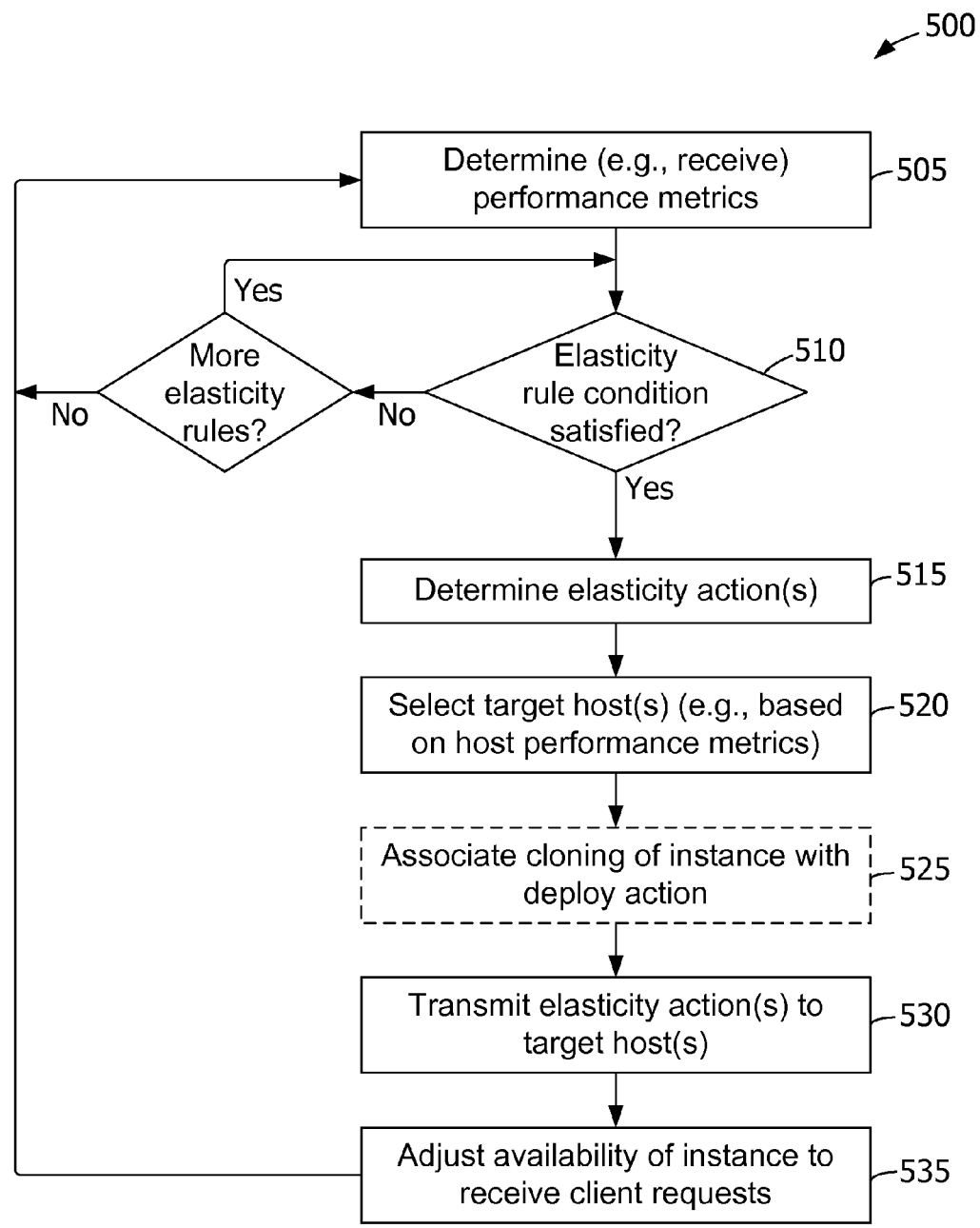
FIG. 5 is a flowchart of an exemplary method performed by a management device, such as the management device shown in FIGS. 3 and 4.

FIG. 4 is a block diagram 400 of an exemplary data flow within cluster system 300. FIG. 5 is a flowchart of an exemplary method 500 performed by a management device, such as management device 320. Although the operations in method 500 are described with reference to management device 320, it is contemplated that any portion of such operations may be performed by any computing device 100 (shown in FIG. 1).

Referring to FIGS. 3 and 4, management device 320 executes application monitoring component 120, elasticity control component 122, and load balancing component 124.

In exemplary embodiments, management device 320 monitors and/or controls execution of a virtual software application 405, or virtual application (vApp), instances of which may be executed by virtual machines (VMs) 235 hosted by hosts 305. For example, management device 320 may maintain a working pool 410 of working (e.g., executing) virtual application instances 415 and a ready pool 420 of ready (e.g., not executing) virtual application instances 425. In some embodiments, VMs 235 are configured to execute virtual application 405. Accordingly, a deactivated (e.g., "powered off" or suspended) VM 235 may include a ready virtual application instance 425, and the ready virtual application instance 425 may be transformed into a working virtual application instance 415 by activating or "powering on" the corresponding VM 235. Similarly, a working virtual application instance 415 may be transformed into a ready virtual application instance 425 by deactivating (e.g., powering off or suspending) the corresponding VM 235.

Referring also to FIG. 5, in exemplary embodiments, management device 320 determines (e.g., collects and/or calculates) 505 performance metrics, including application performance metrics and/or host performance metrics. For example, application monitoring component 120 may receive application performance metrics from working virtual application instances 415 in working pool 410, VMs 235 that execute such working virtual application instance 415, and/or hosts 305 that execute such VMs 235. Application performance metrics represent the performance of one or more working virtual application instances 415. For example, application performance metrics corresponding to an application instance may include the computing resource (e.g., processor, memory, storage, and/or network) utilization associated with the application instance, a response time associated with the application instance, a client request rate associated with the application instance, a quantity of concurrent network connections (e.g., Transmission Control Protocol connections) associated with the instance, and/or a quantity of client sessions associated with the application instance.

In some embodiments, determining 505 the application performance metric includes combining the application performance metrics associated with individual working virtual application instances 415 to create one or more combined application performance metrics associated with virtual application 405. For example, management device 320 may calculate the combined application performance metric as a sum or an average (e.g., a mean or a median) of the individual application performance metrics.

Management device 320 may also determine 505 host performance metrics representing the performance and/or work load of one or more hosts 305. For example, management device 320 may receive host performance metrics from hosts 305. In exemplary embodiments, a host performance metric represents computing resource utilization associated with a host 305. For example, a host performance metric may represent memory utilization, processor utilization, network utilization, and/or storage utilization of the corresponding host 305.

In exemplary embodiments, performance metrics are expressed numerically. For example, processor utilization may be expressed as a percentage of processor capacity used by a software application instance (e.g., a VM 235 or a working virtual application instance 415) executed by a host 305, and network utilization may be expressed as the quantity of data being transmitted and/or received by a host 305 via a network (e.g., network 315). Further, host load metrics may be expressed as absolute values (e.g., processor megahertz used by executing processes) and/or as relative values (e.g., a proportion of available processor megahertz used by executing processes). A performance metric may be an instantaneous value, such as a single reading provided by resource monitoring software (e.g., an operating system and/or application software) executed by a host 305. Alternatively, a performance metric may be calculated as a moving average of such readings provided over a predetermined period of time (e.g., one second, five seconds, or thirty seconds).

In some embodiments, application monitoring component 120 directly determines 505 (e.g., receives and/or calculates) application performance metrics. In addition, or alternatively, application monitoring component 120 may include one or more interface components 430 that determine 505 application performance metrics by receiving application performance metrics from one or more application monitoring services. Such application monitoring services may be executed by load balance device 330 and/or any other computing device 100 (shown in FIG. 1) connected to network 315. Application monitoring component 120 may include a plurality of interface components 430 corresponding to a plurality of application monitoring services, such that application monitoring services may be interchangeable with respect to the function of application monitoring component 120. Further, application monitoring component 120 may receive application performance metrics and/or host performance metrics (e.g., network utilization, response time, and/or quantity of client sessions) from load balancing component 124.

In exemplary embodiments, each interface component 430 implements the same application monitoring application programming interface (API). The application monitoring API includes a configuration function, a reporting function, and a registration function.

The configuration function may accept as input parameters 1) an instance identifier, such as a VM identifier (e.g., a name or a numeric identifier) or a network address (e.g., an Internet Protocol address), and 2) one or more metric-frequency pairs. A metric-frequency pair includes the identifier (e.g., a name or a numeric identifier) of a performance metric that should be monitored (e.g., processor utilization associated with an application instance) and a frequency with which the performance metric should be collected.

The reporting function may accept as input parameters a set of metric-value pairs. A metric-value pair includes the identifier of a performance metric and a value representing a detected value corresponding to the performance metric.

The registration function may accept as input parameters 1) a list of monitoring capabilities, expressed as one or more metric-frequency pairs, and 2) an optional price associated with use of the corresponding application monitoring service. The frequency portion of a metric-frequency pair may include the maximum frequency with which the corresponding application monitoring service is capable of providing the associated performance metric.

In exemplary embodiments, management device 320 stores a plurality of elasticity rules. Each elasticity rule includes a condition and an elasticity action to be performed if the condition is satisfied. The condition may test an application performance metric, such as by comparing the application performance metric to a predetermined threshold value. In some embodiments, application monitoring component 120 determines 505 application performance metrics that are tested by a condition of at least one elasticity rule. Further, the frequency with which performance metrics are determined 505 may be specified as a configuration parameter stored by management device 320.

A condition may compare an application performance metric to a predetermined threshold value to determine whether the threshold value is violated. A threshold value may be expressed as a minimum value or a maximum value. A maximum threshold value is considered violated when an application performance metric is greater than the maximum threshold value. A minimum threshold value is considered violated when an application performance metric is less than the minimum threshold value.

In exemplary embodiments, an elasticity action is a scale-up action or a scale-down action, either of which may be optionally associated with a target quantity of instances. A scale-up action indicates that one or more ready virtual application instances 425 in ready pool 420 should be activated (e.g., powered on). A scale-down action indicates that one or more working virtual application instances 415 should be deactivated (e.g., powered off). In addition, deploy actions and destroy actions, described in more detail below, may be considered elasticity actions.

As one example, an elasticity rule may include a condition of "average request rate <=1000 requests per second" and an elasticity action of "scale down 1". In this example, when the average client request rate for working virtual application instances 415 violates a predetermined minimum threshold value (e.g., one thousand requests per second), the quantity of working virtual application instances 415 is to be decreased by a target quantity (e.g., one), such as by powering off the target quantity of VMs 235. As another example, an elasticity rule may include a compound condition of "average processor utilization >90% OR average response time >1 second" and an elasticity action of "scale up 2". In this example, when the average processor utilization associated with working virtual application instances 415 violates a predetermined maximum threshold value (e.g., ninety percent), or when the average response time associated with working virtual application instances 415 violates predetermined maximum threshold value (e.g., one second), the quantity of working virtual application instances 415 is to be increased by a target quantity (e.g., two), such as by powering on the target quantity of VMs 235.

Management device 320 determines an elasticity action based on the application performance metric and an elasticity rule. In exemplary embodiments, elasticity control component 122 evaluates each elasticity rule to determine 510 whether the condition of any elasticity rule is satisfied. For example, management device 320 may determine that an elasticity action should be performed based on determining 510 that an application performance metric violates a corresponding predetermined threshold value.

If no elasticity rule conditions are satisfied, no elasticity actions are performed, and the current iteration of method 500 ends. In exemplary embodiments, method 500 is executed repeatedly (e.g., periodically, continually, or upon request). Accordingly, the elasticity rules may again be evaluated in a subsequent iteration of method 500.

Figure 6:
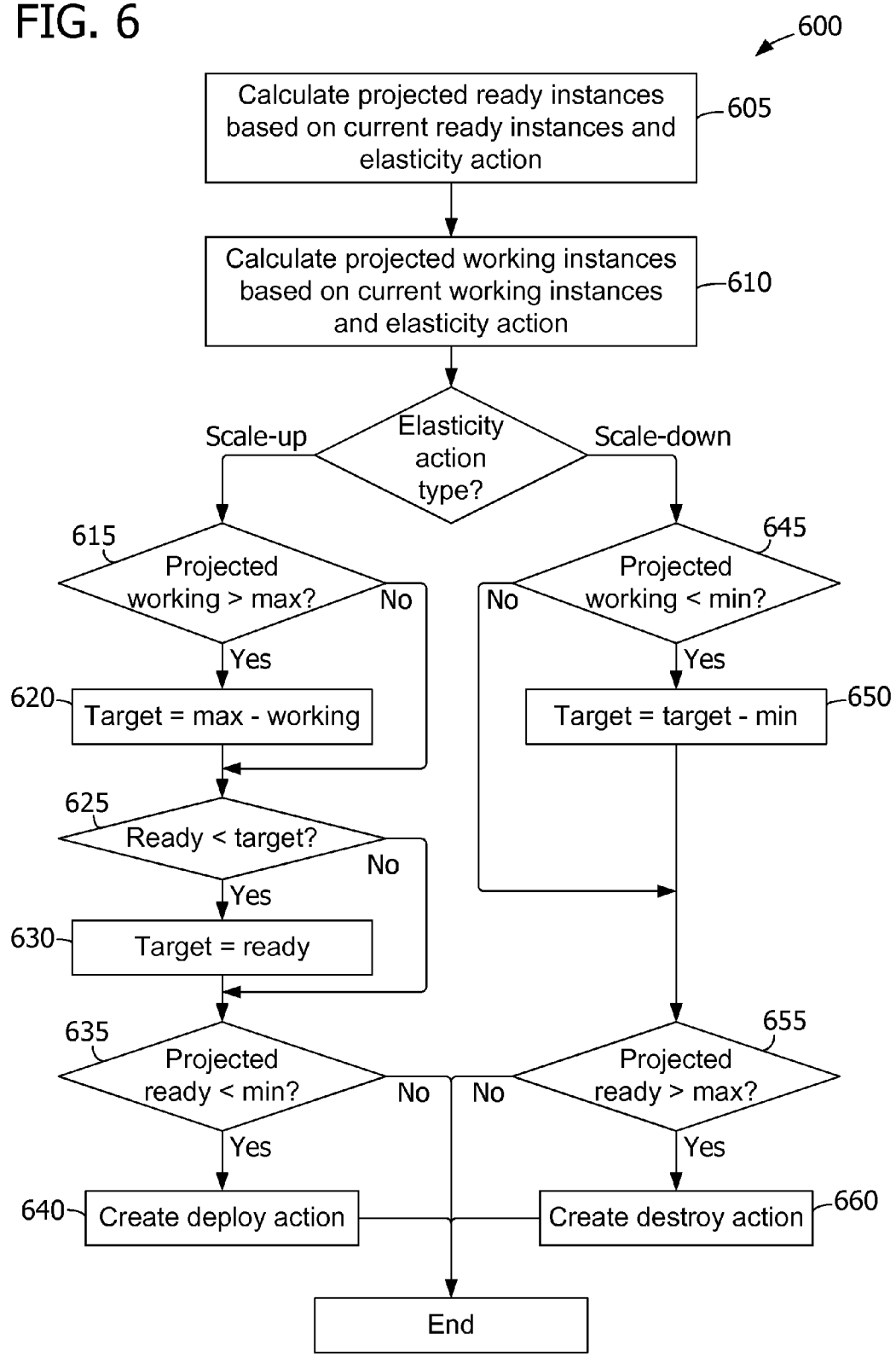
FIG. 6 is a flowchart of an exemplary method for determining elasticity actions based on an elasticity rule.

When an elasticity rule condition associated with a scale-up action or a scale-down action is satisfied, management device 320 determines 515 one or more elasticity actions to perform. FIG. 6 is a flowchart of an exemplary method 600 for determining elasticity actions based on an elasticity rule. The elasticity rule whose condition was determined 510 (shown in FIG. 5) to be satisfied is associated with an elasticity action, such as a scale-up action or a scale-down action. In exemplary embodiments, the elasticity action is associated with a target quantity of instances (e.g., VMs) to power on or power off.

Referring to FIGS. 4 and 6, management device 320 (e.g., via elasticity control component 122) calculates 605 a projected quantity of ready instances (e.g., VMs) based on the target quantity of instances and a current quantity of ready instances 425. For example, when the elasticity action is a scale-up action, the projected quantity of ready instances may be calculated 605 by subtracting the target quantity of instances from the current quantity of ready instances. When the elasticity action is a scale-down action, the projected quantity of ready instances may be calculated 605 by adding the target quantity of instances to the current quantity of ready instances.

In some embodiments, the projected values may be used by management device 320 to ensure that a quantity of ready software application instances is between a predetermined minimum quantity of ready software application instances and predetermined maximum quantity of ready software application instances, and/or to ensure that a quantity of working software application instances is between a predetermined minimum quantity of working software application instances and predetermined maximum quantity of working software application instances.

Management device also calculates 610 a projected quantity of working instances (e.g., VMs) based on the target quantity of instances and a current quantity of working instances 415. For example, when the elasticity action is a scale-up action, the projected quantity of working instances may be calculated 610 by adding the target quantity of instances to the current quantity of working instances. When the elasticity action is a scale-down action, the projected quantity of working instances may be calculated 610 by subtracting the target quantity from the current quantity of working instances.

When the elasticity action is a scale-up action, management device 320 compares 615 the projected working quantity of instances to a predetermined maximum quantity of working instances. When the projected working quantity of instances is greater than the maximum, management device 320 reduces the target quantity of instances, such as by setting 620 the target quantity to the maximum quantity of working instances minus the projected quantity of working instances.

Management device 320 also compares 625 the current quantity of ready instances to the target quantity of instances. When quantity of ready instances is less than the target quantity, management device 320 sets 630 the target quantity to be equal to the current quantity of ready instances. Such an adjustment facilitates allocating all available ready instances to the application.

Management device 320 further compares 635 the projected quantity of ready instances to a predetermined minimum quantity of ready instances. When the projected quantity of ready instances is less than the minimum quantity of ready instances, management device 320 creates 640 a deploy action indicating that one or more additional instances (e.g., VMs) should be added to ready pool 420. In exemplary embodiments, a target quantity of instances to deploy is determined by subtracting the projected quantity of ready instances from the minimum quantity of ready instances. Such embodiments facilitate maintaining the minimum quantity of ready instances in ready pool 420.

When the elasticity action is a scale-down action, management device 320 compares 645 the projected quantity of working instances to a predetermined minimum quantity of working instances. When the projected quantity of working instances is less than the minimum quantity of working instances, management device 320 reduces the target quantity of instances, such as by setting 650 the target quantity to the original target quantity minus the minimum quantity of working instances.

Management device 320 also compares 655 the projected quantity of ready instances to a predetermined maximum quantity of ready instances. When the projected quantity of ready instances is greater than the maximum quantity of ready instances, management device 320 creates 660 a destroy action indicating that one or more instances (e.g., VMs) should be removed from ready pool 420. In exemplary embodiments, a target quantity of instances to destroy is determined by subtracting the maximum quantity of ready instances from the projected quantity of ready instances. Such embodiments facilitate maintaining the maximum quantity of ready instances in ready pool 420.

Referring to FIGS. 4 and 5, management device selects 520 one or more target hosts 305 to perform any determined elasticity action(s). If virtual software application 405 is associated with ready instances 425 and/or working instances 415 on only one host, management device 320 selects 520 that host to perform the elasticity action.

In exemplary embodiments, virtual software application 405 is associated with ready instances 425 and/or working instances 415 hosted by a plurality of hosts. Management device 320 selects 520 target hosts from the plurality of hosts based on host performance metrics, such as computing resource utilization (e.g., processor utilization and/or memory utilization) associated with the hosts. For example, when the elasticity action is a scale-up action, management device 320 may identify a ready instance 425 on a host that is associated with the lowest computing resource utilization among the hosts and select 520 that host.

When the elasticity action is a scale-down action, selecting 520 the target host may include identifying a software application instance based on a quantity of client sessions associated with the software application instance (e.g., zero client sessions, or a lowest quantity of client sessions among working instances 415) and selecting 520 the host that is executing the selected software application instance. For example, management device 320 may select 520 one or more hosts that are executing a software application instance associated with zero client sessions. In some embodiments, a working instance 415 with a non-zero quantity of client sessions may be selected when load balancing component 124 supports session persistency.

In addition, or alternatively, for a scale-down action, management device 320 may identify a software application instance based on a computing resource utilization associated with the software application instance (e.g., a lowest computing resource utilization among working instances 415) and select 520 the host computing device that is executing the identified software application instance. Further, management device 320 may select 520 a host that is executing an instance of the software application instance and is associated with a relatively high computing resource utilization (e.g., a highest computing resource utilization among the hosts).

When the elasticity action is a scale-up action, management device 320 may select 520 a first target host for the scale-up action. Further, as described with reference to FIG. 6, management device 320 may create 640 a deploy action to add one or more ready instances 425. Management device 320 may select 520 the first target host or a second target host for the deploy action based on computing resource utilization associated with the hosts and/or a quantity of instances of the software application being executed by the hosts. For example, the host associated with the lowest computing resource utilization and/or with the lowest quantity of working instances 415 may be selected 520 for the deploy action. When selecting 520 a target host for a deploy action, management device 320 may exclude hosts with insufficient storage capacity for an instance of the software application. Further, management device 320 may select 520 a target host for a deploy action based on the quantity of instances of the software application hosted by the hosts. For example, management device 320 may select 520 hosts that already include at least one instance of the software application, as deploying an instance to other hosts may involve cloning an instance from another host, as described below.

Similarly, when the elasticity action is a scale-down action, management device 320 may create 660 (shown in FIG. 6) a destroy action. Management device 320 may select 520 a target host (e.g., the same host selected 520 for the scale-down action or a different host) for the destroy action based on a quantity of ready software application instances 425 associated with the hosts and computing resource utilization associated with the hosts. For example, the host associated with the highest quantity of ready instances 425 and/or with the highest computing resource utilization may be selected 520 for the destroy action.

When the elasticity actions include a deploy action, management device 320 may associate 525 with the deploy action a cloning of a software application instance (e.g., a VM). In some embodiments, if a host selected 520 for a deploy action is hosting a local source VM executing an instance of the software application, management device 320 associates 525 with the deploy action a cloning of the local source VM on the selected host. Otherwise, management device 320 associates 525 with the deploy action a cloning to the selected host of a remote source VM that is executing an instance of the software application at a host computing device other than the target host computing device.

Management device 320 transmits 530 the elasticity action(s) to the selected target host(s). In response to receiving such elasticity actions, each target host performs the received elasticity action(s), thereby controlling an operation of one or more software application instances. In exemplary embodiments, if a host receives a scale-up action, the host may power on a VM, transforming a ready instance 425 into a working instance 415. Similarly, if the host receives a scale-down action, the host may power off a VM, transforming a working instance 415 into a ready instance 425. When a host receives a deploy action, the host clones an existing VM instance, as described above, adding a ready instance 425 to ready pool 420. When a host receives a destroy action, the host removes a ready instance 425 from ready pool 420.

In exemplary embodiments, based on the elasticity actions, management device 320 adjusts 535 the availability of software application instances to receive client requests. For example, when the elasticity actions include a scale-up action, load balancing component 124 may add the software application instance to a load balancing cluster, such as by notifying load balance device 330 (shown in FIG. 3) of the newly powered-on instance. Such a notification may be initiated when application monitoring component 120 receives a notification (e.g., an instance power-on event or an instance power-off event) from a working instance 415 and, in turn, notifies load balancing component 124. When the elasticity actions include a scale-down action, load balancing component 124 may remove the software application instance from a load balancing cluster, such as by notifying load balance device 330 of the newly powered-off instance. Such a notification may be initiated when application monitoring component 120 determines that a working instance 415 is no longer responsive and, in turn, notifies load balancing component 124.

In some embodiments, load balancing component 124 directly adjusts 535 the availability of application instances. For example, load balancing component 124 may receive requests from client devices 325 and forward such requests to application instances that load balancing component 124 has determined are available. In addition, or alternatively, load balancing component 124 may include one or more interface components 435 that communicate elasticity actions and/or events (e.g., power-on events and/or power-off events) to one or more load balancing services executed by load balance device 330. Load balancing component 124 may include a plurality of interface components 435 corresponding to a plurality of load balancing services, such that load balancing services may be interchangeable with respect to the function of load balancing component 124.

In exemplary embodiments, each interface component 435 implements the same load balancing application programming interface (API). The load balancing API includes a registration function, a configuration function, a creation function, a destruction function, an addition function, and a removal function. Interface component 435 may further include a health check function and a performance query function. Exemplary function signatures and descriptions are shown in Table 1.

application instances in a load balancing cluster), a network layer at which load balancing is performed (e.g., layer 3, layer 4, and/or layer 7), protocols supported or optimized, load balancing algorithms, session persistency, session persistency techniques, server health check, server health check techniques, content caching, web acceleration (e.g., data compression, parallel transfers, and/or Hypertext Transfer Protocol pipelining), and/or encryption (e.g., Secure Sockets Layer) acceleration.

Extended parameters may include parameters that are specific to a particular load balancing service and are not supported by the load balancing API for all load balancing services. An extended parameter may be included in a configuration associated with virtual software application 405 and provided to load balancing device 330 by load balancing component 124.

The parameters accepted by the configuration function may vary based on the type of the load balancing service that corresponds to interface 435. For example, if a load balancing service supports multiple session persistency techniques, one

TABLE 1

| Function | Description |
| --- | --- |
| Registration | Register a load balancing service of a specified type and providing specified capabilities at a specified price, with optional extended parameters. |
| Configuration | Configure a load balancing cluster. Parameters may vary based on the type of load balance service being used. |
| Creation | Creates a load balancing cluster using a specified virtual Internet Protocol (IP) address and/or a specified domain name service (DNS). |
| Destruction | Destroys a load balancing cluster using a specified virtual Internet Protocol (IP) address and/or a specified domain name service (DNS) name. |
| Addition | Add the guest instance specified by a VM identifier, a network address, or a physical address (e.g., a media access control address) to the load balancing cluster specified by a virtual IP address and/or DNS name. |
| Removal | Remove the guest instance specified by a VM identifier, a network address, or a physical address (e.g., a media access control address) from the load balancing cluster specified by the virtual IP address or DNS name. |
| Health Check | Retrieve the health status of a specified application instance. |
| Performance Query | Retrieve performance metrics (e.g., application performance metrics) specified by one or more metric identifiers. |

The registration function accepts a load balancing service type. In exemplary embodiments, load balancing service types may include direct routing (e.g., in which application instances are assigned virtual network addresses), network address translation (NAT, in which each application instance is assigned an internal network address that is inaccessible by client devices 325, and load balancer 330 is assigned the virtual network address of the cluster), IP tunneling (in which each application instance is assigned an internal network address, and load balancer 330 is assigned the virtual network address of the cluster), proxy (in which each application instance is assigned an internal network address, and load balancer 330 is assigned the virtual network address of the cluster), DNS (in which the application instances are assigned the same DNS name, and each is assigned an external network address accessible by client devices 325), guest-level distributed load balancing (in which the application instances share a virtual network address and a virtual media access control address), and hypervisor-level distributed load balancing (in which the application instances share a virtual network address).

The capability list is expressed as one or more capability-value pairs. Capabilities may include, for example, a maximum throughput, a scalability (e.g., maximum quantity of of the supported session persistency techniques may be specified when invoking the configuration function.

The methods described may be performed by computing devices, such as hosts 201 in cluster 200 (shown in FIG. 3). The computing devices communicate with each other through an exchange of messages and/or stored data. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

Exemplary Operating Environment

The operations described herein may be performed by a computer or computing device. A computer or computing device may include one or more processors or processing units, system memory, and some form of computer readable media. Exemplary computer readable media include flash memory drives, digital versatile discs (DVDs), compact discs (CDs), floppy disks, and tape cassettes. By way of example and not limitation, computer readable media comprise computer-readable storage media and communication media. Computer-readable storage media store information such as computer readable instructions, data structures, program modules, or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the disclosure are operative with numerous other general purpose or special purpose computing system environments or configurations. Examples of well known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The operations illustrated and described herein may be implemented as software instructions encoded on a computer-readable medium, in hardware programmed or designed to perform the operations, or both. For example, aspects of the disclosure may be implemented as a system on a chip.

The embodiments illustrated and described herein as well as embodiments not specifically described herein but within the scope of aspects of the disclosure constitute exemplary means for maintaining high availability of software application instances, such as virtual machines.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for executing virtual machines on one or more computing devices, the system comprising:
   a plurality of host computing devices; and
   a management device coupled in communication with the host computing devices, the management device configured to:
      determine an application performance metric representing performance of one or more instances of a software application executed by virtual machines (VMs) that are hosted by the plurality of host computing devices;
      determine an elasticity action based on the application performance metric, wherein the elasticity action comprises a scale-up action that instructs a target host computing device of the plurality of host computing devices to activate a target quantity of VMs;
      calculate a projected quantity of ready VMs based on the target quantity of VMs and a current quantity of ready VMs in a ready pool of ready VMs; and
      when the projected quantity of ready VMs is less than a predetermined minimum quantity of ready VMs, transmit a deploy action to the target host computing device, the deploy action instructing the target host computing device to add one or more VMs to the ready pool of ready VMs.

2. The system of claim 1, wherein the management device executes an application monitoring component including a plurality of interface components corresponding to a plurality of application monitoring services, and wherein the management device is configured to:
   receive an application performance metric from an application monitoring service of the plurality of application monitoring services; and
   determine the elasticity action based on determining that the application performance metric received from application monitoring service violates a predetermined threshold value.

3. The system of claim 1, wherein the management device is further configured to:
   calculate a projected quantity of working VMs based on the target quantity of VMs and a current quantity of working VMs; and
   reduce the target quantity of VMs when the projected quantity of working VMs is greater than a predetermined maximum quantity of working VMs.

4. A method comprising:
   determining, by a management device, an elasticity action based on an application performance metric representing performance of one or more instances of a software application, wherein the elasticity action comprises a scale-up action;

selecting, by the management device, one or more target host computing devices from a plurality of host computing devices based on host performance metrics representing performance of the plurality of host computing devices;

transmitting by the management device the determined elasticity action to the selected one or more target host computing devices, wherein the selected one or more target host computing devices control an operation of one or more software application instances based on the elasticity action; and when a projected quantity of ready software application instances is less than a predetermined minimum quantity of ready software application instances:

selecting a second target host computing device from the plurality of host computing devices based on one or more of the following: computing resource utilization associated with the second target host computing device and a quantity of instances of the software application being executed by the second target host computing device; and transmitting a deploy action to the second target host computing device, the deploy action instructing the target host computing device to add one or more VMs to the ready pool of ready VMs; and wherein the projected quantity of ready software application instances is based on the scale-up action and a current quantity of ready software application instances.

5. The method of claim 4, wherein the one or more target host computing devices are selected based on host performance metrics representing computing resource utilization associated with the host computing devices.

6. The method of claim 4, wherein the one or more target host computing devices are selected based on host performance metrics comprising one or more of the following: processor utilization and memory utilization.

7. One or more non-transitory computer-readable storage media having computer-executable components comprising:

an elasticity control component that when executed causes at least one processor to:

determine an elasticity action based on an application performance metric, wherein the elasticity action comprises a scale-up action that instructs a target host computing device to activate a target quantity of VMs; and transmit the determined elasticity action to the target host computing device; and a load balancing component that when executed causes at least one processor to:

when a projected quantity of ready software application instances is less than a predetermined minimum quantity of ready software application instances:

select a second target host computing device based on one or more of the following: computing resource utilization associated with the second target host computing device and a quantity of instances of the software application being executed by the second target host computing device; and transmit a deploy action to the second target host computing device, the deploy action instructing the target host computing device to add one or more VMs to the ready pool of ready VMs; and wherein the projected quantity of ready software application instances is based on the scale-up action and a current quantity of ready software application instances.

8. The non-transitory computer-readable storage media of claim 7, further comprising an application monitoring component that when executed causes at least one processor to determine the application performance metric based on one or more of the following: a computing resource utilization associated with the software application, a response time associated with the software application, a client request rate associated with the software application, and a quantity of client sessions associated with the software application.

9. The non-transitory computer-readable storage media of claim 7, wherein the elasticity control component further causes the processor to determine the elasticity action based on determining that the application performance metric violates a predetermined threshold value.

10. The non-transitory computer-readable storage media of claim 7, wherein the load balancing component includes a plurality of interface components corresponding to a plurality of load balancing services, wherein each interface component of the plurality of interface components, when executed by at least one processor, causes the processor to communicate to a load balancing service one or more of the following: an instance activation event and an instance deactivation event.

11. A system for executing virtual machines on one or more computing devices, the system comprising:

a plurality of host computing devices; and a management device coupled in communication with the host computing devices, the management device configured to:

determine an application performance metric representing performance of one or more instances of a software application executed by virtual machines (VMs) that are hosted by the plurality of host computing devices;

determine an elasticity action based on the application performance metric, wherein the elasticity action comprises a scale-down action that instructs a target host computing device of the plurality of host computing devices to de-activate a target quantity of VMs;

calculate a projected quantity of ready VMs based on the target quantity of VMs and a current quantity of ready VMs in a ready pool of ready VMs; and when the projected quantity of ready VMs is greater than a predetermined maximum quantity of ready VMs, transmit a destroy action to the target host computing device, the destroy action instructing the target host computing device to remove one or more VMs from the ready pool of ready VMs.

12. A method comprising:

determining, by a management device, an elasticity action based on an application performance metric representing performance of one or more instances of a software application, wherein the elasticity action comprises a scale-down action;

selecting, by the management device, one or more target host computing devices from a plurality of host computing devices based on host performance metrics representing performance of the host computing devices;

transmitting by the management device the determined elasticity action to the selected one or more target host computing devices, wherein the selected target host computing devices control an operation of one or more software application instances based on the elasticity action; and when a projected quantity of ready software application instances is greater than a predetermined maximum quantity of ready software application instances:

selecting a second target host computing device from the plurality of host computing devices based on one or more of the following: computing resource utilization associated with the second target host computing device and a quantity of instances of the software application being executed by the second target host computing device; and transmitting a destroy action to the second target host computing device, the destroy action instructing the target host computing device to remove one or more VMs from the ready pool of ready VMs; and wherein the projected quantity of ready software application instances is based on the scale-down action and a current quantity of ready software application instances.

13. The method of claim 12, wherein selecting the one or more target host computing devices comprises:

selecting by the management device a software application instance based on a quantity of client sessions associated with the software application instance; and identifying by the management device a host computing device that is executing the selected software application instance.

14. The method of claim 12, wherein selecting the one or more target host computing devices comprises:

selecting by the management device a software application instance based on a computing resource utilization associated with the software application instance; and identifying by the management device a host computing device that is executing the selected software application instance.

* * * * *